United States Patent [19]
Bielefeldt

[11] 3,948,771
[45] Apr. 6, 1976

[54] METHOD AND APPARATUS FOR SEPARATING SUSPENDED MATTER FROM A FLUID BY CENTRIFUGAL FORCE

[75] Inventor: Ernst-August Bielefeldt, Hollenstedt, Germany

[73] Assignee: Messerschmitt-Bölkow-Blohm GmbH, Germany

[22] Filed: June 6, 1975

[21] Appl. No.: 584,295

Related U.S. Application Data

[63] Continuation of Ser. No. 420,659, Nov. 30, 1973, abandoned.

[52] U.S. Cl. .................. 210/84; 210/201; 210/207; 210/220; 210/512 M; 209/211; 55/461
[51] Int. Cl.² ......................................... B01D 21/26
[58] Field of Search ........... 210/63, 65, 74, 84, 199, 210/201, 207, 220, 304, 512, 519, 537; 55/431, 461, 463, 447; 209/211, 144, 143, 133, 210

[56] References Cited
UNITED STATES PATENTS

| | | |
|---|---|---|
| 430,444 | 6/1890 | Smith .................... 55/461 |
| 535,099 | 3/1895 | Gale et al. ............. 55/461 |
| 1,660,687 | 2/1928 | Stebbins ................ 209/144 |
| 2,767,840 | 10/1956 | Dobson et al. ......... 209/144 |
| 2,816,440 | 12/1957 | Boudway et al. ...... 210/512 |
| 3,358,844 | 12/1967 | Klein et al. ........... 209/211 |
| 3,672,503 | 6/1972 | Mark .................... 209/144 |
| 3,789,988 | 2/1974 | Valibouse .............. 210/512 |

FOREIGN PATENTS OR APPLICATIONS

| | | |
|---|---|---|
| 231,156 | 5/1910 | Germany ............... 55/461 |

*Primary Examiner*—Thomas G. Wyse
*Assistant Examiner*—F. F. Calvetti
*Attorney, Agent, or Firm*—McGlew and Tuttle

[57] ABSTRACT

The fluid to be treated is directed along a main flow path and past a flow-off edge on the concave side of the main flow path to produce a stationary whirl at least contacting the main fluid flow and in which suspended matter is separated from the fluid, by centrifugal force, to provide purified fluid. At selected locations in the stationary whirl, a selected one of the purified fluid and the suspended matter is separated and withdrawn from the stationary whirl. The non-separated portion of the fluid volume, whose suspended matter content is now changed, is returned into the main flow. The geometric form of the whirl axis is selected in accordance with the particular requirements of each installation. Thus, starting from a simple cylindrical configuration, the whirl may take any form having a curvilinear axis, even an annular form with a circular axis. In the radial direction, the whirl may be limited by any curved surface such as, for example, a cylindrical surface, a barrel-shape surface, and similar surfaces of appropriate form.

17 Claims, 9 Drawing Figures

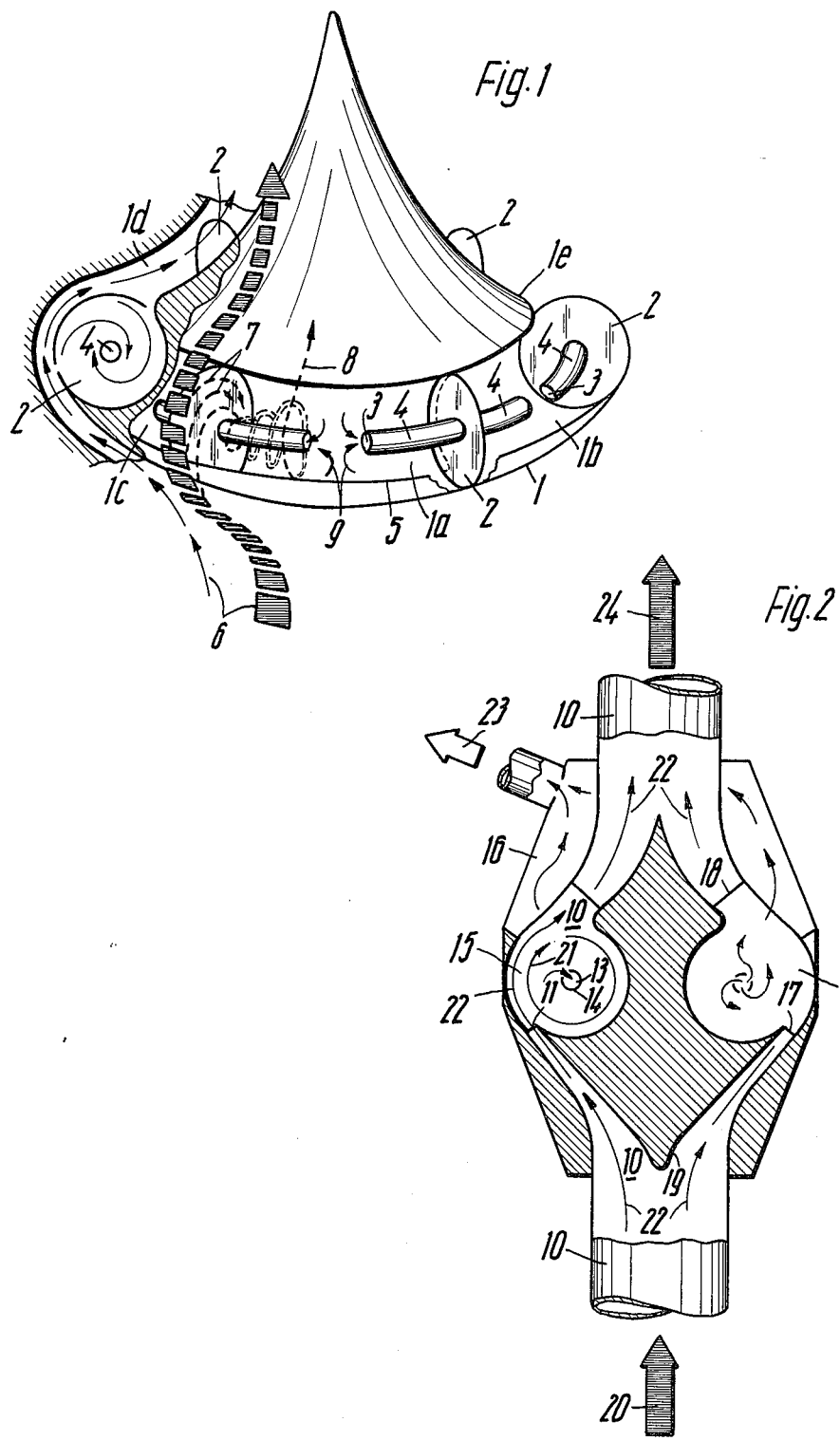

METHOD AND APPARATUS FOR SEPARATING SUSPENDED MATTER FROM A FLUID BY CENTRIFUGAL FORCE

This is a continuation of application Ser. No. 420,659 filed Nov. 30, 1973 now abandoned.

FIELD AND BACKGROUND OF THE INVENTION

This invention relates to a method of and apparatus for separating suspended matter from a fluid by centrifugal force, in which the fluid to be treated is directed into a main flow duct of curved configuration where the fluid stream, while moving along a concave surface and past a flow-off edge, produces a stationary whirl maintaining contact with, or partially merging with, the main flow and in which whirl, at appropriate locations, either purified fluid or suspended matter is separated and withdrawn from the whirl while the non-separated portion of the flow volume returns into the main flow stream.

The invention is directed to the problem of providing an optimal arrangement for this method and, to solve this problem, the invention provides, in each case, to adapt the geometry of the whirl and of the whirl axis to the respective requirements. Thus, in accordance with the invention and starting from a simple cylindrical configuration, the whirl may take any form with a curvilinear axis, even an annular form with a circular axis. Further in accordance with the invention, the whirl, in its radial direction, may be limited by a surface of any suitable form such as, for example, a cylindrical surface, a barrel-shape surface, or any other appropriate curved surface.

In accordance with a development of the invention, the fluid to be treated is directed into a widening and/or narrowing funnel-shaped main flow duct having an annular curved portion along which the fluid flow takes the form of a laminar stream layer and, at the entrance of which, the fluid flow is partly deviated to produce an annular whirl of toroidal configuration either maintaining contact with or partially merging with the laminar portion of the main stream. This development of the invention has the advantage of permitting a space-saving arrangement in tubular pipe systems.

An advantageous embodiment of the invention provides a plurality of whirls arranged either in series, in parallel, or in series and parallel with each other.

In accordance with a further development of the invention, the separation takes place in the whirl chamber, in the zone of the greatest concentration of the specifically heavy phase, and the separated portion is evacuated either into the main stream or into another conduit. This has the advantage that the throughput of the fluid to be treated, per whirl chamber and per unit of time, can be increased.

A further characteristic of the method of the invention is that the separated volume, containing the specifically heavy phase, can be returned into the main stream either at the entrance end or the exit end of the whirl chamber. Thereby, in the same manner as by injection, a driving impulse is imparted to the main stream. A driving effect is also obtained as a result of the separation, because the portion of the volume with the specifically heavy phase preferably is evacuated by suction.

In accordance with the invention, it is sometimes advantageous to direct the fluid to be treated into whirl chambers which are adjacent each other. The volumetric proportion of the fluid to be treated in a single whirl chamber thereby may be increased.

Also in accordance with the invention, compressed air may be added to the fluid to be treated in the zone of the whirl, whereby a further driving effect is produced.

With respect to the separation of the specifically heavy phase from the treated fluid, it is useful to evacuate the particles accumulating at the periphery of the whirl immediately. Within the scope of the invention, such a measure is to be considered as a direct separation close to the whirl.

As a further feature of the invention, the main flow may be directed continuously past one or more whirl zones with the advantage that the process of the invention results in power saving and increased efficiency.

An object of the invention is to provide an improved method of separating suspended matter from a fluid by centrifugal force.

Another object of the invention is to provide improved apparatus for separating suspended matter from a fluid by centrifugal force.

A further object of the invention is to provide such a method and apparatus in which there is produced a stationary whirl of the fluid to be treated which at least maintains contact with a main flow of the fluid to be treated, and in which the geometry of the whirl and of the whirl axis is adapted to the particular requirements of each installation.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a perspective view, partly in section, illustrating the principle of an annular whirl;

FIG. 2 is a sectional view illustrating an arrangement for producing an annular whirl and comprising a main flow duct with a conically widened whirl producing portion;

DESCRIPTION OF THE PREFERRED EMBODIMENTS

Figure 3:
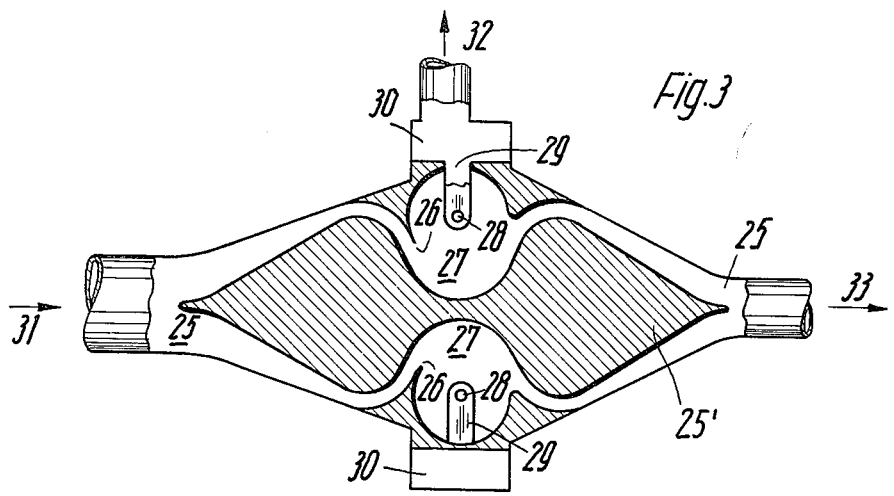
FIG. 3 is a view similar to FIG. 2 illustrating an arrangement for producing an annular whirl comprising a main flow duct with a narrowing whirl producing portion.

Referring to FIG. 1, an annular whirl chamber 1 is illustrated as comprising chamber sections 1a, 1b, 1c, 1d and 1e separated by partition walls 2. Exhaust conduits 4, having exhaust ports 3, serve to draw off a fluid volume from each chamber section into the interior of the associated partition walls 2, from which the fluid is further evacuated or withdrawn. The main stream or main flow 6 of the fluid to be treated or purified flows past a flow-off edge 5, and its thus deflected portion produces rotary whirls in the chamber sections 1a – 1e. The outer or peripheral portion of each of the thus produced whirls is either in cntact with or partly merges with the main stream 6 of the fluid to be treated.

By virtue of the formation of a whirl, that portion of the fluid deviated by flow-off edge 5 of annular chamber 1 creates centrifugal fields in chamber sections 1a – 1e. Close to both surfaces of the partition walls 2 separating the chamber sections, secondary flow effects are produced by the gyration of the fluid, as indicated in dashed lines 7. The solid particles contained in the gyrating fluid are subjected to centrifugal force and, as indicated by the dotted lines 8, are carried outwardly into still more radially distant zones of the whirl and away from those portions of the partition walls nearer the center of each chamber section. During this gyratory motion in still larger spirals, the solid particles are subjected to increasing centrifugal forces until finally, in the central zone, they are ejected and pass again into the main stream. As indicated by the arrows 9, the purified or treated portions of the fluid are drawn off through exhaust ports 3 and exhaust conduits 4 into the interior of partition walls 2.

In the embodiment of the invention shown in FIG. 2, a fluid duct 10 includes a widened portion within which there is a body of revolution 19, a double conoidal shape, formed with a circular flow-off edge 11 and with a circular recess of approximately semi-circular cross-section adjacent thereto. The body 19 is mounted within the widened portion of fluid duct 10 so as to form a funnel-like passage for the fluid, which passage diverges on the inlet side and converges on the outlet side of the widened portion of duct 10. Thereby, an annular chamber 12 is formed between the widened portion of duct 10 and the recessed portion of body 19, adjacent a flow-off edge 11. Exhaust ports 13 connected to exhaust conduits 14 are located at several positions in annular chamber 12, preferably on the central axis thereof.

In the same manner as in the embodiment of the invention shown in FIG. 1, annular chamber 12 is divided, by partition walls 15, into several chamber sections which are adjacent to each other. Exhaust conduits 14 communicate with the interior of partition walls 15, from which the fluid, drawn off from the chamber sections, is evacuated into a peripheral duct 16. In the embodiment of the invention shown in FIG. 2, the terminal edges 17 and 18 of partition walls 15 extend radially beyond the cross-section of annular chamber 12 and into the adjacent areas of duct 10. Thus, the partition walls 15 can be used simultaneously for retaining body 19 in position within duct 10.

The fluid to be purified or treated flows into duct 10 in the direction of arrow 20 and, in passing flow-off edge 11, produces rotary whirls 21. Whirls 21 extend over the entire circular length of annular chamber 12, and either keep contact with or partly merge with the main stream 22 of the fluid.

Purified or treated fluid is drawn off through exhaust ports 13, exhaust conduits 14, the interiors of partition walls 15 and peripheral duct 16, and is removed in the direction of the arrow 23. The non-purified peripheral portion of the fluid whirl returns into, and continues to move with, the main stream in the direction of arrow 24, to further series-connected annular chambers or other appropriate separators.

In accordance with the principle mentioned above, secondary flow effects, produced in the vicinity of partition walls 15 in the chamber sections, improve the efficiency of the fluid evacuation and the degree of separation.

A somewhat similar arrangement is provided in the embodiment of the invention shown in FIG. 3, which comprises two funnel-shaped portions of a fluid duct 25, namely a widening portion at the entrance end and a narrowing portion at the exit end. An annular chamber 27 is formed between these two portions by means of an inserted body of rotation 25' having a double-conoidal shape. In this embodiment of the invention, however, circular flow-off edge 26 is formed on duct 25 so that, at the inlet side of annular chamber 27, the fluid stream is directed toward the interior of the duct. Exhaust ports 28 and exhaust conduits 29 connected thereto are provided preferably at several locations along the central axis of annular chamber 27, and communicate with an annular duct 30 surrounding main duct 25 in the zone of annular chamber 27.

Fluid to be purified or treated enters in the direction of arrow 31, passes through the coverging passage between the funnel-shaped surface of duct 25 and the conoidal surface of inserted body 25' and, in flowing past the flow-off edge 26, produces a rotary whirl. Arrow 32 indicates the direction in which the purified fluid is removed from duct 30. The main stream of the fluid, whose concentration of suspended matter is increased by the entrained non-purified portion of the whirls, continues to move in the direction of arrow 33.

Figure 4:
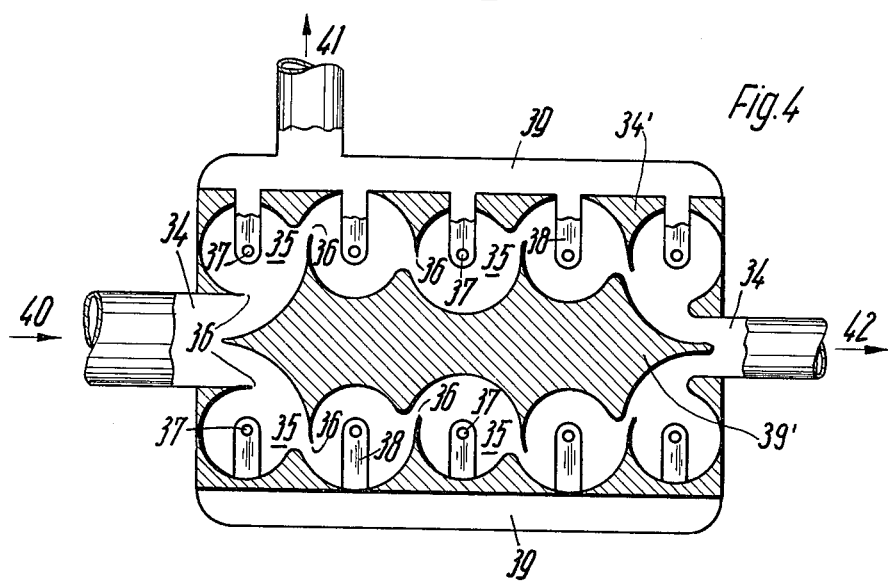
FIG. 4 is a sectional view illustrating a plurality of annular whirls arranged in series.

FIG. 4 illustrates an embodiment of the invention in which a plurality of annular chambers 35 is arranged, with the chambers 35 in parallel relationship one after the other, in a cylindrical housing 34' connected in a fluid duct 34. The inner surfaces of housing 34' and an inserted body of rotation 39' are shaped so as to form the annular chambers 35, and a corresponding number of circular flow-off edges 36 is provided with the edges arranged alternately on body 39' and the inner surface of housing 34'. Exhaust conduits 38 communicating with exhaust ports 37 are provided in annular chambers 35 and communicate with the peripheral annular duct 39 surrounding cylindrical housing 34'.

The fluid to be treated moves in the direction of arrow 40 through duct 34 and the whirl chambers 35. In the same manner as described above, a purified or treated portion of the fluid is separated from the main stream in annular chambers 35 by means of the produced whirls, and is drawn off through exhaust ports 37 in conduits 38 into annular duct 39 for removal in the direction of arrow 41. The remaining volume of the whirl, now having a greater concentration of suspended matter or impurities, is entrained by the main stream of the fluid flowing through duct portion 34 in the direction of arrow 42. In a variation of the embodiment of the invention shown in FIG. 4, a plurality of annular chambers, arranged one after the other, may be formed by only widening or by only narrowing funnel-shaped portions.

Figure 5:
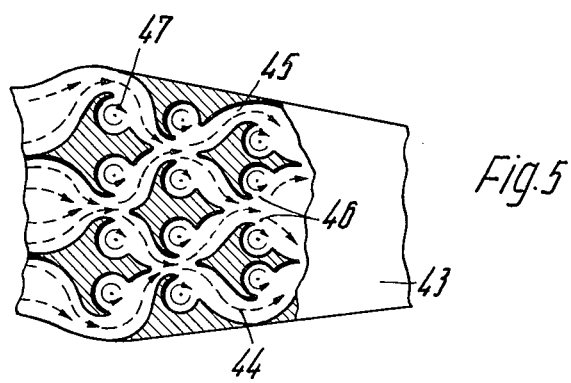
FIG. 5 is a view, similar to FIG. 4, illustrating a plurality of straight line whirls arranged in parallel.

FIG. 5 illustrates an arrangement embodying the invention in which a main fluid duct 43 is subdivided into a plurality of parallel-connected, curved passages 44, 45 and 46, which are provided with corresponding flow-off edges, whirl zones and upstream edges. In this arrangement, series and parallel connections of whirls 47 are combined.

Figure 6:
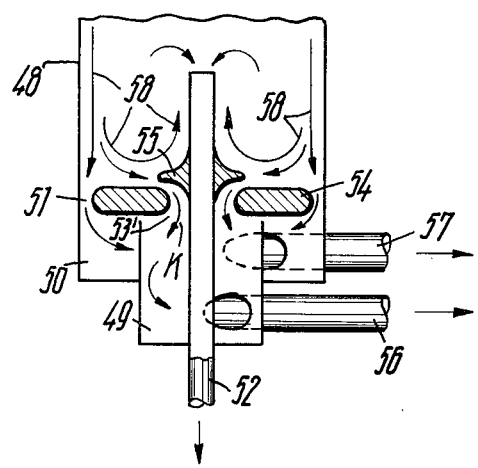
FIG. 6 is a sectional view illustrating a whirl chamber including evacuation means.

FIG. 6 illustrates a further embodiment of the invention in which two concentrically arranged accumulation chambers 49 and 50 are provided in a whirl chamber 48, and are separated from the upper space of whirl chamber 48 by an annular plate 54. Outer accumulation chamber 50 communicates with whirl chamber 48 through an annular aperture 51 provided in plate 54 adjacent the wall of whirl chamber 48, and inner accumulation chaber 49 communicates with whirl chamber 48 through an annular aperture 53 provided in plate 54 adjacent a central or axially extending exhaust tube 52 for the purified or treated fluid. Aperture 53 is additionally defined by a guide means 55 provided on exhaust tube 52 and serving, at the same time, for the creation of the whirl in whirl chamber 48. Respective fine matter exhaust conduits 56 and 57 are associated with accumulation chambers 49 and 50. As in the previously described embodiments of the invention, portions of the main stream are branched off to produce whirls in whirl chamber 48 and to produce secondary flows due to friction on the walls thereof. This is indicated in FIG. 6 by the arrows 58. In this embodiment of the invention, apertures 51 and 53 may also be effective individually, that is, one or the other of the apertures 51 or 53 may be omitted.

Figure 7:
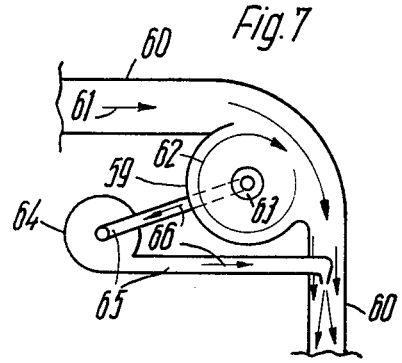
FIG. 7 is a sectional view illustrating a whirl chamber including means for re-injection of the removed portion of the fluid volume.

In the embodiment of the invention shown in FIG. 7, a whirl chamber 59 is provided, in which the whirl 62, creating the centrifugal field, is produced by a main stream of fluid flowing through a curved conduit 60 and passing along a part of the circumferential periphery of chamber 59 in the direction of arrow 61. The treated portion of the fluid is removed from the whirl axially through an exhaust conduit 63 projecting into whirl chamber 59. Exhaust conduit 63 communicates with a fine matter removal pipe 65 in which there is interposed a blower 64. The fine matter flows through pipe 65 in the direction of arrow 66, and the pipe is connected to the main conduit 60 downstream of whirl chamber 53.

Figure 8:
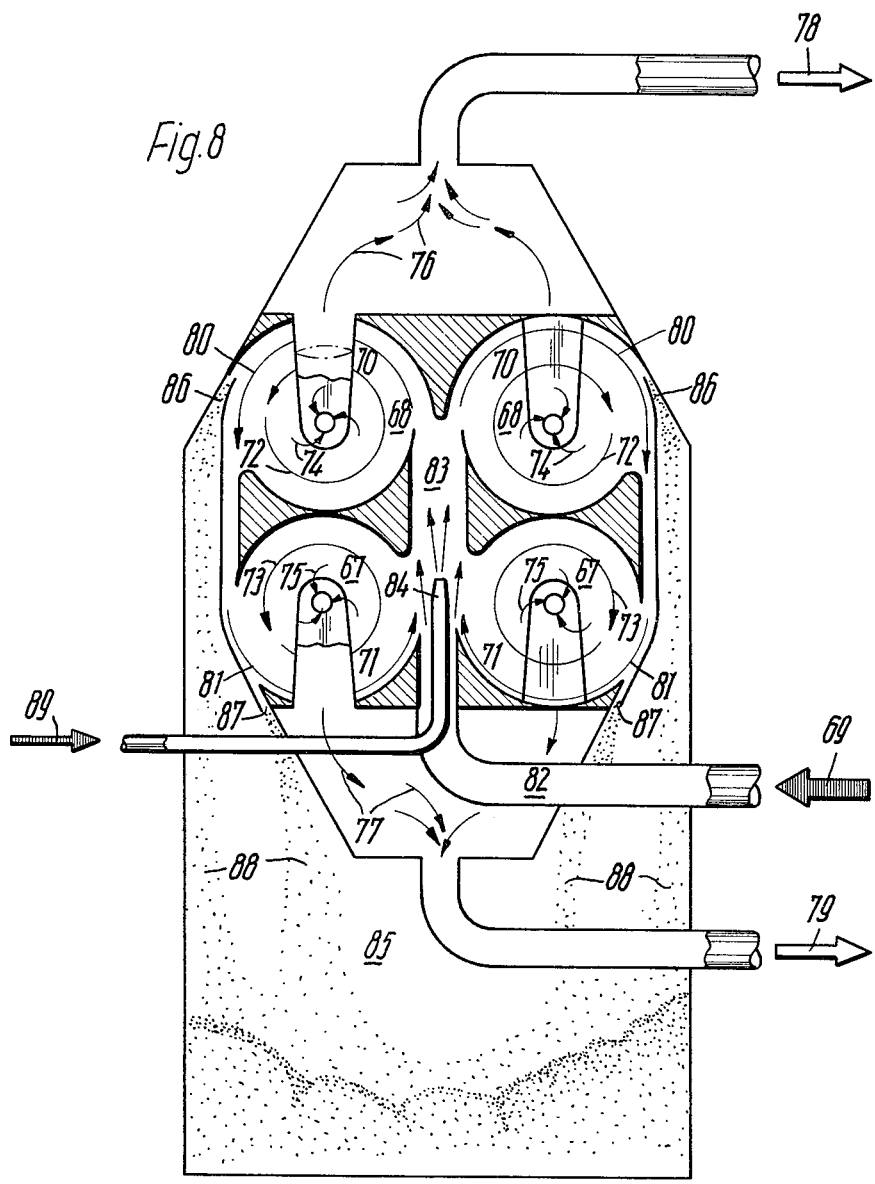
FIG. 8 is a sectional view illustrating a whirl chamber utilizing injection of compressed air.

FIG. 8 illustrates an embodiment of the invention in which two annular chambers 67 and 68 are arranged one above the other. The fluid 69 to be treated is conducted partly against funnel-shaped curved surfaces continued as toroidal surfaces to form annular chambers 67 and 68. These chambers are divided by respective partition walls 70 and 71, at which the respective rotary whirls 72 and 73 are created. The whirls are in contact with, or partly merged with, the main stream which flows axially upwardly to move along the upper portion of the circumferential surface of upper annular chamber 68 and to return downwardly along the outer periphery of both chambers 68 and 67. At several locations, preferably on the circular axes of annular chambers 67 and 68, purified or treated fluid is removed from the respective whirls 72 and 73, as indicated by the respective arrows 74 and 75, and is drawn off in the direction of the respective arrows 76, 78 and 77, 79. The other portion of the fluid is conducted in the direction of the arrows 80, 81. Respective passages 86 and 87 are provided in the peripheral zones of annular chambers 67, 68, through which solid particles 88, separated by the centrifugal forces, pass into an accumulator tank 85.

Fluid to be treated is supplied into the device through a conduit 82 communicating with an injection chamber 83 extending axially of annular chambers 67 and 68. A compressed air inlet nozzle 84 is provided in injection chamber 83, and compressed air is supplied thereto as indicated by the arrow 89. Thereby, compressed air is added to the fluid 69 to be treated before the whirls 72 and 73 are produced. This results in a direct separation of the solid particles both from the main stream and from the non-purified portion of the rotary whirls, because the particles 88, carried out to the peripheries of the whirls, pass immediately through the respective passages 86 and 87 into accumulator tank 85 located beneath annular chambers 67 and 68.

Figure 9:
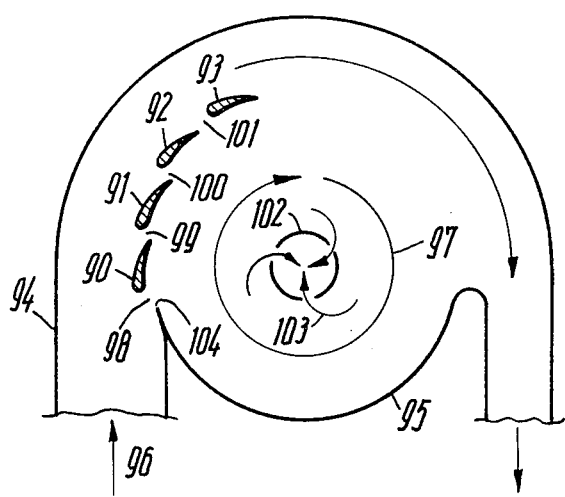
FIG. 9 is a sectional view illustrating a whirl chamber provided with guide baffles.

In the embodiment of the invention shown in FIG. 9, a whirl chamber 95 is provided in the curved or bent portion of a curved fluid duct 94 through which fluid passes in the direction of arrow 96. The fluid stream produces a centrifugal field 97 in whirl chamber 95. In the border zone between centrifugal field 97 and the main stream, guide baffles 90 – 93 are provided, these baffles having airfoil cross-sections and forming passages 98 – 101. Together with a flow-off edge 104, these passages 98 – 101 contribute to the lamination of the partial stream forming the whirl, and thereby to a more uniform gyratory motion of the fluid within the chamber. The purified or treated fluid portion is removed axially through an exhaust conduit 102 extending into the whirl chamber, as indicated by arrows 103.

While specific embodiments of the invention have been shown and described in detail to illustrate the application of the principles of the invention, it will be understood that the invention may be embodied otherwise without departing from such principles.

What is claimed is:

1. A method of separating a specifically heavy phase of suspended matter from a lighter fluid by centrifugal force comprising the steps of directing the fluid to be treated along an annular main flow path having a mean radius, equal to one half the sum of its inner and outer radii, which alternately increases and decreases progressively longitudinally of the flow direction so as to form a partial toroidal layer and past an annular flow-off edge projecting tangentially in the flow direction on the radially inner side of the main flow path and forming a wall of a toroidal whirl chamber tangent to the radially inner side of, and communication with, the annular main flow path concentric with such annular main flow path, and having an outer radius, transversely of such annular main flow path, substantially equal to the inner radius of such annular main flow path, to produce a stationary whirl in the form of a torus in the toroidal whirl chamber at least contacting, in its zone of tangency with the main flow path, such partial toroidal layer, and in which stationary whirl heavier suspended matter is separated from the fluid, by centrifugal force, to provide purified fluid; at a predetermined location in the stationary toroidal whirl, separating and withdrawing part of the purified fluid from the stationary whirl; and returning the non-separated portion of the fluid volume, whose suspended matter content is now increased into the main flow.

2. A method of separating suspended matter from a fluid by centrifugal force, as claimed in claim 1, in which the mean radius of the annular main flow path increases in the flow direction at the annular flow-off edge to form an outer partly toroidal layer of the fluid to be treated.

3. A method of separating suspended matter from a fluid by centrifugal force, as claimed in claim 1, in which the mean radius of the annular main flow path decreases in the flow direction at the annular flow-off edge to form an inner partly toroidal layer of the fluid to be treated.

4. A method of separating suspended matter from a fluid by centrifugal force, as claimed in claim 1, in which a plurality of stationary whirls is produced, with the stationary whirls arranged in series with each other.

5. A method of separating suspended matter from a fluid by centrifugal force, as claimed in claim 1, in which a plurality of stationary whirls is produced, with the stationary whirls arranged in parallel with each other.

6. A method of separating suspended matter from a fluid by centrifugal force, as claimed in claim 1, in which, within the toroidal whirl chamber, there is a zone of maximum concentration of the specifically heavy phase of suspended matter; and effecting such separating and withdrawing of the suspeneded matter in such zone of maximum concentration of the specifically heavy phase of suspended matter.

7. A method of separating suspended matter from a fluid by centrifugal force, as claimed in claim 6, including the step of returning the separated portion of the volume containing the specifically heavy phase of suspended matter into the main flow before the whirl.

8. A method of separating suspended matter from a fluid by centrifugal force, as claimed in claim 6, including the step of returning the separated portion of the volume containing the specifically heavy phase of suspended matter into the main flow after the whirl.

9. A method of separating suspended matter from a fluid by centrifugal force, as claimed in claim 1, in which the stationary whirl is produced in a whirl chamber divided into whirl chamber sections which are adjacent each other.

10. A method of separating suspended matter from a fluid by centrifugal force, as claim in claim 1, including the step of supplying compressed air into the fluid to be treated adjacent to the stationary toroidal whirl.

11. A method of separating suspended matter from a fluid be centrifugal force, as claimed in claim 1, in which particles accumulating at the periphery of the stationary toroidal whirl are removed immediately from the whirl.

12. A method of separating suspended matter from a fluid by centrifugal force, as claimed in claim 1, including directing the main flow past at least one stationary toroidal whirl zone as an endless circulating flow.

13. A method of separating suspended matter from a fluid by centrifugal force, as claimed in claim 1, including directing the main flow past several stationary toroidal whirl zones as an endless circulating flow.

14. Apparatus for separating a specifically heavy phase of suspended matter from a lighter fluid by centrifugal force comprising, in combination, conduit means directing the fluid to be treated along an annular main flow path having a mean radius, equal to one half the sum of its inner and outer radii, which alternately increases and decreases progressively longitudinally of the flow direction so as to form a partial toroidal layer; a toroidal whirl chamber, having a curvilinear cross-section and a curved longitudinal axis, positioned along said annular main flow path and having a flow-off edge projecting tangentially in the flow direction into said main flow path on the radially inner side thereof to produce a stationary whirl in the form of a torus, in said toroidal whirl chamber, with the stationary whirl at least contacting the main fluid flow in the zone of tangency of the whirl chamber and the annular main flow path, and in which stationary whirl suspended matter is separated from the fluid, by centrifugal force, to provide purified fluid; means at a predetermined location in said toroidal whirl chamber operable to separate and withdraw part of the purified fluid from the stationary toroidal whirl in said toroidal whirl chamber; and means operable to return the non-separated portion of the fluid volume, whose suspended matter content is now increased, into the main flow.

15. Apparatus for separating suspended matter from a fluid by centrifugal force, as claimed in claim 14, in which said conduit means is formed, before said whirl chamber, as an injection chamber; at least one compressed-air inlet nozzle in said injection chamber; passage means at the periphery of said whirl chamber for particles to be separated; and an accumulator tank communicating with said passage means.

16. Apparatus for separating suspended matter from a fluid by centrifugal force, as claimed in claim 14, in which said conduit means is formed, after said whirl chamber, as an injection chamber; at least one compressed-air inlet nozzle in said injection chamber; passagr means at the periphery of said whirl chamber for particles to be separated; and an accumulator tank communicating with said passage means.

17. Apparatus for separating suspened matter from a fluid by centrifugal force, as claimed in claim 14, including at least one guide means defining a passage slot provided in the whirl chamber and projecting into the main flow path.

* * * * *